(12) United States Patent
Jacobs et al.

(10) Patent No.: US 8,769,233 B2
(45) Date of Patent: Jul. 1, 2014

(54) ADJUSTING THE AMOUNT OF MEMORY ALLOCATED TO A CALL STACK

(75) Inventors: Brent W. Jacobs, Rochester, MN (US); Nathan D. Miller, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 13/159,480

(22) Filed: Jun. 14, 2011

(65) Prior Publication Data

US 2012/0324194 A1    Dec. 20, 2012

(51) Int. Cl.
*G06F 12/00* (2006.01)
*G06F 13/00* (2006.01)
*G06F 13/28* (2006.01)

(52) U.S. Cl.
USPC ................................. 711/170; 711/E12.002

(58) Field of Classification Search
CPC ....................................................... G06F 12/02
USPC .......................................... 711/170, E12.002
See application file for complete search history.

(56) References Cited

U.S. PATENT DOCUMENTS

| | | | | |
|---|---|---|---|---|
| 3,878,513 A | * | 4/1975 | Werner | 711/154 |
| 4,524,416 A | * | 6/1985 | Stanley et al. | 711/200 |
| 4,969,091 A | * | 11/1990 | Muller | 712/228 |
| 5,727,178 A | | 3/1998 | Pletcher et al. | |
| 6,349,406 B1 | * | 2/2002 | Levine et al. | 717/128 |
| 6,968,557 B1 | | 11/2005 | Zhang et al. | |
| 7,827,510 B1 | * | 11/2010 | Schubert et al. | 716/136 |
| 2003/0221067 A1 | * | 11/2003 | Jacobs | 711/118 |
| 2005/0246362 A1 | * | 11/2005 | Borland | 707/101 |
| 2007/0074189 A1 | * | 3/2007 | Srinivas et al. | 717/144 |
| 2008/0168460 A1 | * | 7/2008 | Lee et al. | 718/104 |
| 2008/0189488 A1 | * | 8/2008 | DeWitt et al. | 711/132 |
| 2009/0007075 A1 | * | 1/2009 | Edmark et al. | 717/128 |
| 2010/0174762 A1 | * | 7/2010 | Bryan et al. | 707/814 |
| 2011/0119463 A1 | * | 5/2011 | Lee et al. | 711/170 |

OTHER PUBLICATIONS

Vladislav Gelfer, How to release memory pages occupied by the thread stack when possible, http://www.codeproject.com/KB/cpp/StackShrink.aspx?display=Print, Jan. 7, 2006, pp. 1-7, The Code Project.

* cited by examiner

*Primary Examiner* — Sheng-Jen Tsai
(74) *Attorney, Agent, or Firm* — Owen J. Gamon; Matthew C. Zehrer

(57) ABSTRACT

In an embodiment, a plurality of stack depths of a stack are sampled from all stack depths of the stack. An average of the plurality of stack depths is calculated. If a number of the plurality of stack depths is greater than a maximum sample threshold and the average of the plurality of stack depths is greater than or equal to a current depth of the stack, then pages are deallocated from the stack that are above the average of the plurality of stack depths. If the number of the plurality of stack depths is greater than the maximum sample threshold and the average of the plurality of stack depths is less than the current depth of the stack, then pages are deallocated from the stack that are above the current depth of the stack.

20 Claims, 4 Drawing Sheets

US 8,769,233 B2

ADJUSTING THE AMOUNT OF MEMORY ALLOCATED TO A CALL STACK

FIELD

An embodiment of the invention generally relates to computer systems and more particularly to computer system with a call stack.

BACKGROUND

Computer systems typically comprise a combination of computer programs and hardware, such as semiconductors, transistors, chips, circuit boards, storage devices, and processors. The storage devices store data and the computer programs, which are executed by the processors.

The computer programs are often divided into pieces, which call or invoke each other. The pieces are typically referred to as methods, functions, modules, parts, classes, procedures, or subroutines. When a first method (the caller) calls or invokes a second method (the callee), the caller method stops executing and the callee method gains control of the processor and begins executing. When the callee method stops executing, it returns control of the processor to the caller method, which resumes execution at the next instruction following the call instruction that invoked the callee method.

In order to facilitate this call and return technique, computers often use a call stack, which is also known as a run-time stack, a function stack, an execution stack, an invocation stack, or simply a stack. The call stack comprises entries (also known as frames) for each active method. An entry stores information about the execution of its respective method. The information may comprise any, some, or all of identifiers of the method, the return address of the method (the location of the instruction in the caller method to execute next after the callee method returns), the values of local variables read or written by the method, parameters passed to the method, an evaluation stack of operands for arithmetic or logical operations, a pointer to the current instance of the method, the enclosing method context, and/or the privilege or authority level of the method.

The call stacks use the principle of Last In First Out (LIFO), meaning that the last (or most recent) entry added (pushed) to the top of the call stack is the first (or next) item that is removed (popped) from the top of the call stack. For example, in response to a first method invoking a second method, a new entry is created for the first method and pushed to the top of the call stack. If the second method calls a third method, a new entry for the second method is pushed onto the call stack. Once a currently executing method ends, the entry of its caller method is popped from the top of the stack and used to restore the operating environment of the caller method. Since many methods may call each other and calls may be nested or even recursive, the call stack grows and shrinks as the program executes.

SUMMARY

A method, computer-readable storage medium, and computer system are provided. In an embodiment, a plurality of stack depths of a stack are sampled from all stack depths of the stack. An average of the plurality of stack depths is calculated. If the number of the plurality of stack depths is greater than a maximum sample threshold and the average of the plurality of stack depths is greater than or equal to a current depth of the stack, then pages are deallocated from the stack that are above the average of the plurality of stack depths. If the number of the plurality of stack depths is greater than the maximum sample threshold and the average of the plurality of stack depths is less than the current depth of the stack, then pages are deallocated from the stack that are above the current depth of the stack.

Figure 1:
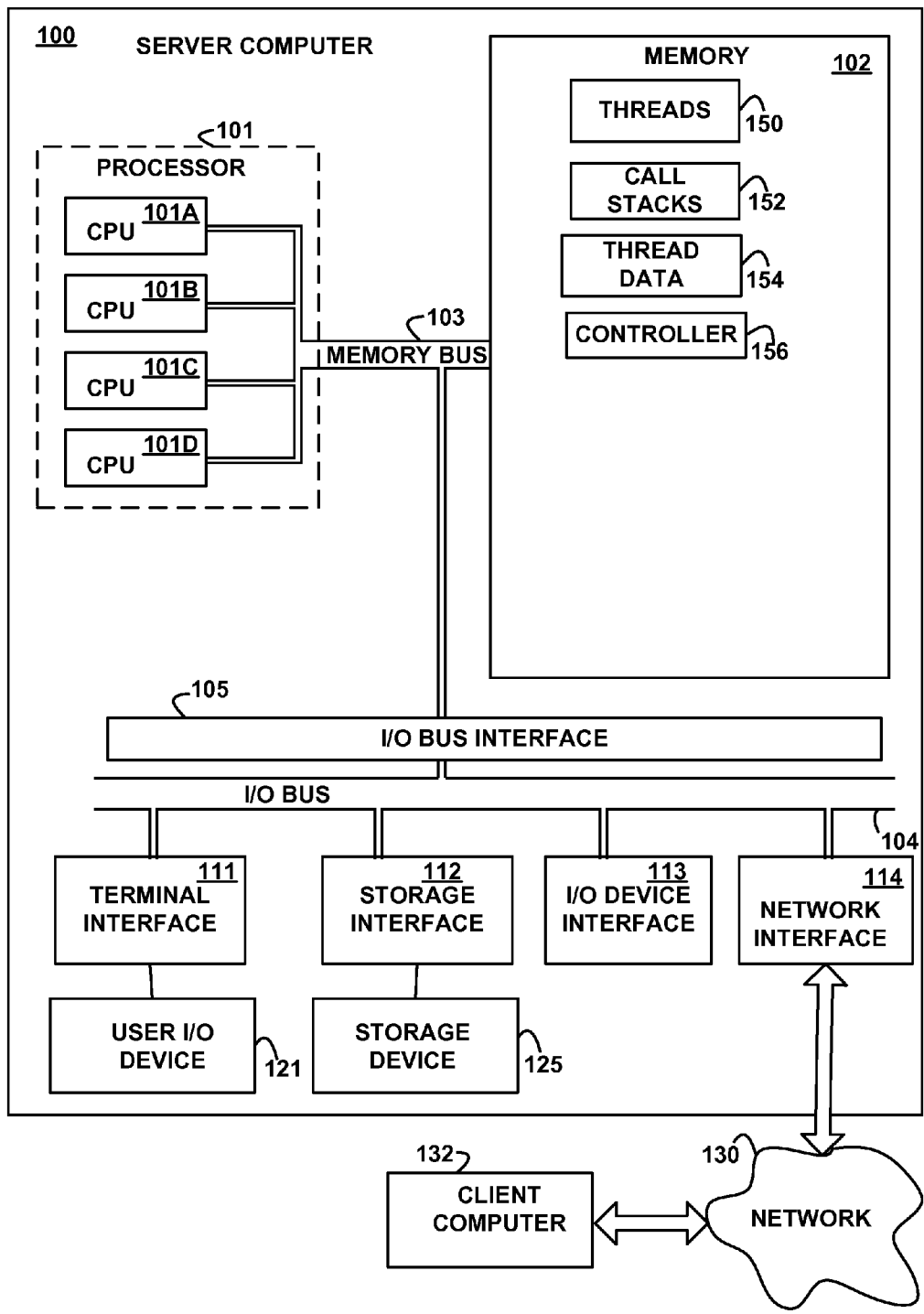
FIG. 1 depicts a high-level block diagram of an example system for implementing an embodiment of the invention.

It is to be noted, however, that the appended drawings illustrate only example embodiments of the invention, and are therefore not considered a limitation of the scope of other embodiments of the invention.

DETAILED DESCRIPTION

In an embodiment, in response to the halting of the execution of a thread due to a system call, interrupt or preemption, the depth of the thread's call stack is sampled or read and saved. The call stack depths at the various times of the sampling are summed together and a maximum depth of the thread's call stack is also saved. In response to a maximum number of samples being saved, the sampling is suspended (the sample time period ends) and the average stack depth of the samples is calculated after subtracting the maximum depth of the thread's call stack from the sum of the sampled depths, in order to remove a possible infrequent outlier.

If the average stack depth of the samples is greater than or equal to the current stack depth, then physical pages of memory that are allocated to the call stack and whose addresses are above the average depth of the thread's call stack are freed or deallocated, and the allocated stack depth is set to the sample average stack depth. The processing of the system call, interrupt, or preemption then continues.

If the average stack depth in the sample is less than the current stack depth, the physical pages of memory whose addresses are above the current stack depth are deallocated, the allocated stack depth is set to the current stack depth and an adjust flag is set, indicating that the allocated stack depth may be later further lowered if possible. The processing of the system call, interrupt, or preemption then continues.

While sampling is suspended, each time that the thread is swapped out or execution of the thread is halted, if the adjust flag is set and the current stack depth for the thread is less than or equal to the sample average stack depth (calculated earlier while sampling was not suspended), then the allocated stack depth is set to the sample average stack depth and physical pages that are allocated to the call stack and whose addresses are above the sample average stack depth are deallocated. Further, the adjust flag is cleared, to prevent the allocated stack depth from being adjusted again, until after another sampling period.

In response to sampling suspension timing out, a determination is made if a number of allocated stack depths accumulated in a second sampling of a final depth accumulator (which accumulates the allocated depth of all allocated pages while sampling is suspended) has reached a maximum threshold. If so, then a final stack depth accumulation is reduced by a predetermined weight factor and is used as a seed to the sampling accumulation, which is started again. In an embodiment, this allows for some convergence between the lower sampled stack depth values and the higher final allocated stack depth values. The processing of the system call, interrupt or preemption then continues. Thus, an embodiment of the invention frees stack pages that are no longer necessary, allowing the pages to be used by other threads or other processes. If the stack depths used by the thread were high when the thread started, the depth of stack pages allocated to the thread are gradually lowered if the stack needs of the thread have stabilized at a lower level.

Referring to the drawings, wherein like numbers denote like parts throughout the several views, FIG. 1 depicts a high-level block diagram representation of a server computer system 100 connected to a client computer system 132 via a network 130, according to an embodiment of the present invention. The term "server" is used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 comprises one or more general-purpose programmable central processing units (CPUs) 101A, 101B, 101C, and 101D, herein generically referred to as the processor 101. In an embodiment, the computer system 100 comprises multiple processors typical of a relatively large system; however, in another embodiment the computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium for storing or encoding data and programs. In another embodiment, the memory 102 represents the entire virtual memory of the computer system 100, and may also include the virtual memory of other computer systems coupled to the computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is encoded with or stores threads 150, call stacks 152, thread data 154, and a controller 156. Although the threads 150, the call stacks 152, the thread data 154, and the controller 156 are illustrated as being contained within the memory 102, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, the threads 150, the call stacks 152, the thread data 154, and the controller 156 are not necessarily all completely contained in the same storage device at the same time. Further, although the threads 150, the call stacks 152, the thread data 154, and the controller 156 are illustrated as being separate entities, in other embodiments some of them, portions of some of them, or all of them may be packaged together.

In an embodiment, the threads 150 and/or the controller 156 comprise instructions or statements that execute on the processor 101 or instructions or statements that are interpreted by instructions or statements that execute on the processor 101, to carry out the functions as further described below with reference to FIGS. 2, 3, 4, and 5. In another embodiment, the threads 150 and/or the controller 156 are implemented in hardware via semiconductor devices, chips, logical gates, circuits, circuit cards, and/or other physical hardware devices in lieu of, or in addition to, a processor-based system. In an embodiment, the threads 150 and/or the controller 156 comprise data in addition to instructions or statements.

The memory bus 103 provides a data communication path for transferring data among the processor 101, the memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, comprise multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the client computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The client computer system 132 may comprise some or all of the hardware and computer program elements of the computer 100. The client computer system 132 may also comprise additional elements not illustrated for the computer 100.

FIG. 1 is intended to depict the representative major components of the computer system 100, the network 130, and the client computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, radio frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
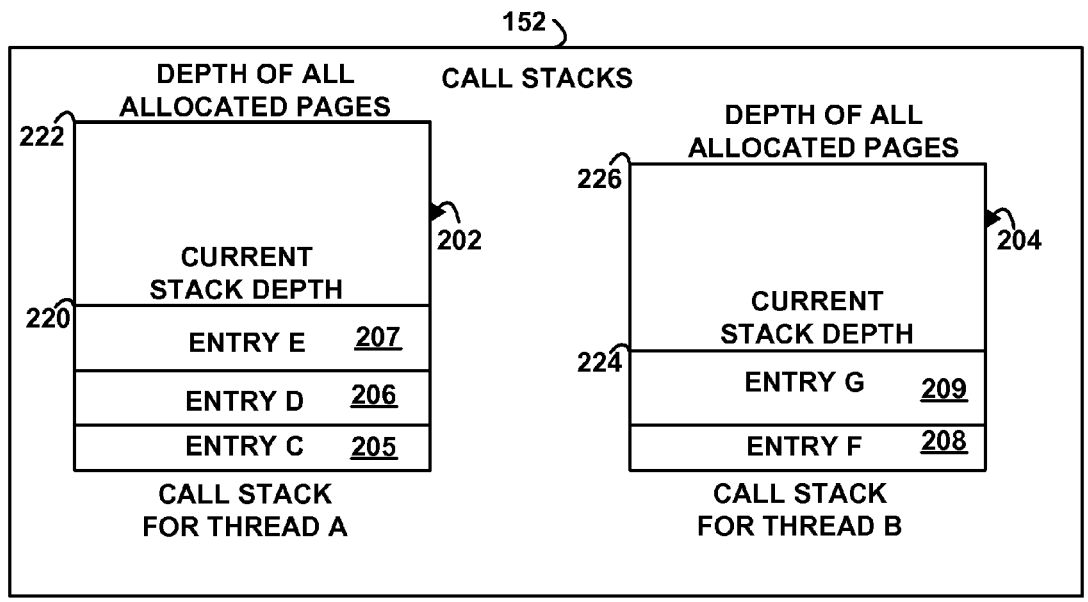
FIG. 2 depicts a block diagram of an example data structure for call stacks, according to an embodiment of the invention.

FIG. 2 depicts a block diagram of an example data structure for call stacks 152, according to an embodiment of the invention. The call stacks 152 are also known as run-time stacks, function stacks, execution stacks, invocation stacks, or simply stacks. The call stacks 152 comprise a call stack 202 for the thread A and a call stack 204 for the thread B. The call stacks 152 generically refer to the call stack 202 and the call stack 204. The threads A and B are examples of, and are generically referred to by, the threads 150 (FIG. 1).

The call stack 202 for the thread A comprises entries 205, 206, and 207. The call stack 204 for the thread B comprises entries 208 and 209. In other embodiments, any number of stacks and any appropriate number of entries in the call stacks 152 may be present. Stack entries are also known as stack frames. The entries 205, 206, 207, 208, and 209 store information about the active methods, functions, modules, parts, classes, procedures, or subroutines of programs that execute in the respective thread on the processor 101. The information may comprise any, some, or all of identifiers of the active methods, the return address of a method (the location of the instruction to execute next after the called method ends), the values of local variables read or written by the method, parameters passed to the method, an evaluation stack of operands for arithmetic or logical operations, a pointer to the current instance of the method, the enclosing method context, and/or the privilege or authority level of the method.

The call stacks 202 and 204 use the principle of Last In First Out (LIFO), meaning that the last (or most recent) entry added to the top of the stack is the first (or next) item that is removed from the top of the stack. The top of the call stack 202 is identified by the current stack depth 220, and the top of the call stack 204 is identified by the current stack depth 224. Thus, the last entry on the top of the call stack A is the entry 207, and the last entry on the top of the call stack B is the entry 209. In an embodiment, the call stacks grow from bottom to top, from smallest memory address to largest memory address with the entry 205 stored at the smallest memory address and the entry 207 stored at the largest memory address of an entry in the call stack 202, with the depth of all allocated pages 222 identifying a memory address that is larger than the memory address identified by the current stack depth 220. Similarly, the entry 208 is stored at the smallest memory address and the entry 209 is stored at the largest memory address of an entry in the call stack 204, with the depth of all allocated pages 226 identifying a memory address that is larger than the memory address identified by the current stack depth 224. In another embodiment, the call stacks grow from largest memory address to smallest memory address The storage whose addresses are between the current stack depth 220 and the depth of all allocated pages 222 represents the storage that is allocated to the call stack 202, but which does not currently contain any valid entries. Since the storage whose addresses are between the current stack depth 220 and the depth of all allocated pages 222 is allocated to the call stack 202, that allocated but unused storage is not available for use by other stacks, other programs, or for other purposes. The storage between the current stack depth 224 and the depth of all allocated pages 226 represents the storage that is allocated to the call stack 204, but which does not contain any valid entries. Since the storage between the current stack depth 224 and the depth of all allocated pages 226 is allocated to the call stack 204, that allocated but unused storage is not available for use for by other stacks, other programs, or other purposes.

In response to one method (the caller) calling another method (the callee), rather than simply jumping to another part of the thread, the current instruction address in the caller method is pushed (added) to a new entry for the caller method at the top of the call stack. This instruction address is then used in response to termination of the callee method, by popping (removing) the caller method's entry off the call stack and restoring the program counter (which identifies the next instruction to be executed by the processor 101) back to the value that was stored in the popped entry. In various embodiments, the pushing and popping of entries may be performed by the processor 101, by the controller 156, by a work or task manager, or by any other appropriate program.

The pushing of a new entry to the top of the call stack 202 moves the current stack depth 220 towards the depth of all allocated pages 222 and decreases the amount of allocated but unused storage in the call stack 202. The popping of an entry from the top of the call stack 202 moves the current stack depth 220 away from the depth of all allocated pages 222 and increases the amount of allocated but unused storage in the call stack 202. Similarly, the pushing of a new entry to the top of the call stack 204 moves the current stack depth 224 towards the depth of all allocated pages 226 and decreases the amount of allocated but unused storage in the call stack 204. The popping of an entry from the top of the call stack 204 moves the current stack depth 224 away from the depth of all allocated pages 226 and increases the amount of allocated but unused storage in the call stack 204.

Popping an entry from a call stack 202 or 204 changes the current stack depth 220 or 224, but does not change the depth of all allocated pages 222 or 226. That is, the page that comprises the popped entry remains allocated to the call stack from which it was popped. If a pushed entry would cause the current stack depth 220 or 224 to exceed the depth of all allocated pages 222 or 226, the controller 156 allocates a new page in which to store the pushed entry and increases the depth of all allocated pages 222 or 226, accordingly. If a pushed entry does not cause the current stack depth 220 or 224 to exceed the depth of all allocated pages 222 or 226, the controller 156 does not allocate a new page and instead stores the pushed entry in an already allocated page.

The controller 156 deallocates or frees pages from the call stacks 152 and adjusts the depth of all allocated pages 222 or 226 via a sampling technique, as further described below with reference to FIGS. 4 and 5.

The example entries 205, 206, and 207 result from, and comprise data that describe the operating environment of, methods that execute in the thread A, and the entries 208 and 209 result from, comprise data that describe the operating environment of, methods that execute in the thread B. The method in the thread A associated with the entry 205 called the method in the thread A associated with entry 206, which called the method in the thread A associated with entry 207. The method in the thread B associated with the entry 208 called the method in the thread B associated with entry 209.

In an embodiment, a thread 150 is a single sequence of instructions, which may be executed by the processor 101 in parallel with other sequences, either by time slicing or multiprocessing. In another embodiment, a thread 150 is synonymous with a process or a task. In another embodiment, a thread 150 is different from a process in that processes are independent, include state information, have separate address spaces, and interact through system-provided inter-process communication mechanisms, while the threads 150 are a technique for splitting a program into two or more simultaneously running tasks, where the threads 150 share the state information of a single process and share memory and other resources directly. In various embodiments, the threads 150 may be implemented via preemptive multithreading, cooperative multithreading, or any other type of multithreading. Preemptive multithreading allows an operating system to determine when a context switch should occur. Cooperative multithreading, on the other hand, relies on the threads 150 themselves to relinquish control once they are at a stopping point.

Figure 3:
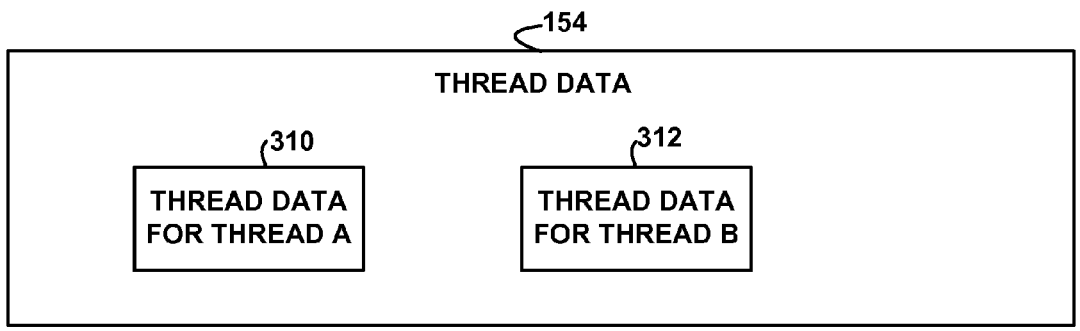
FIG. 3 depicts a block diagram of an example data structure for thread data, according to an embodiment of the invention.

FIG. 3 depicts a block diagram of an example data structure for the thread data 154, according to an embodiment of the invention. The example thread data 154 comprises thread data 310 for the thread A and thread data 312 for the thread B. The thread data 154 generically refers to the thread data 310 and the thread data 312. The thread data 310 stores data or variables used by the controller 156 for the respective thread, as further described below with reference to FIGS. 4 and 5.

Figure 4:
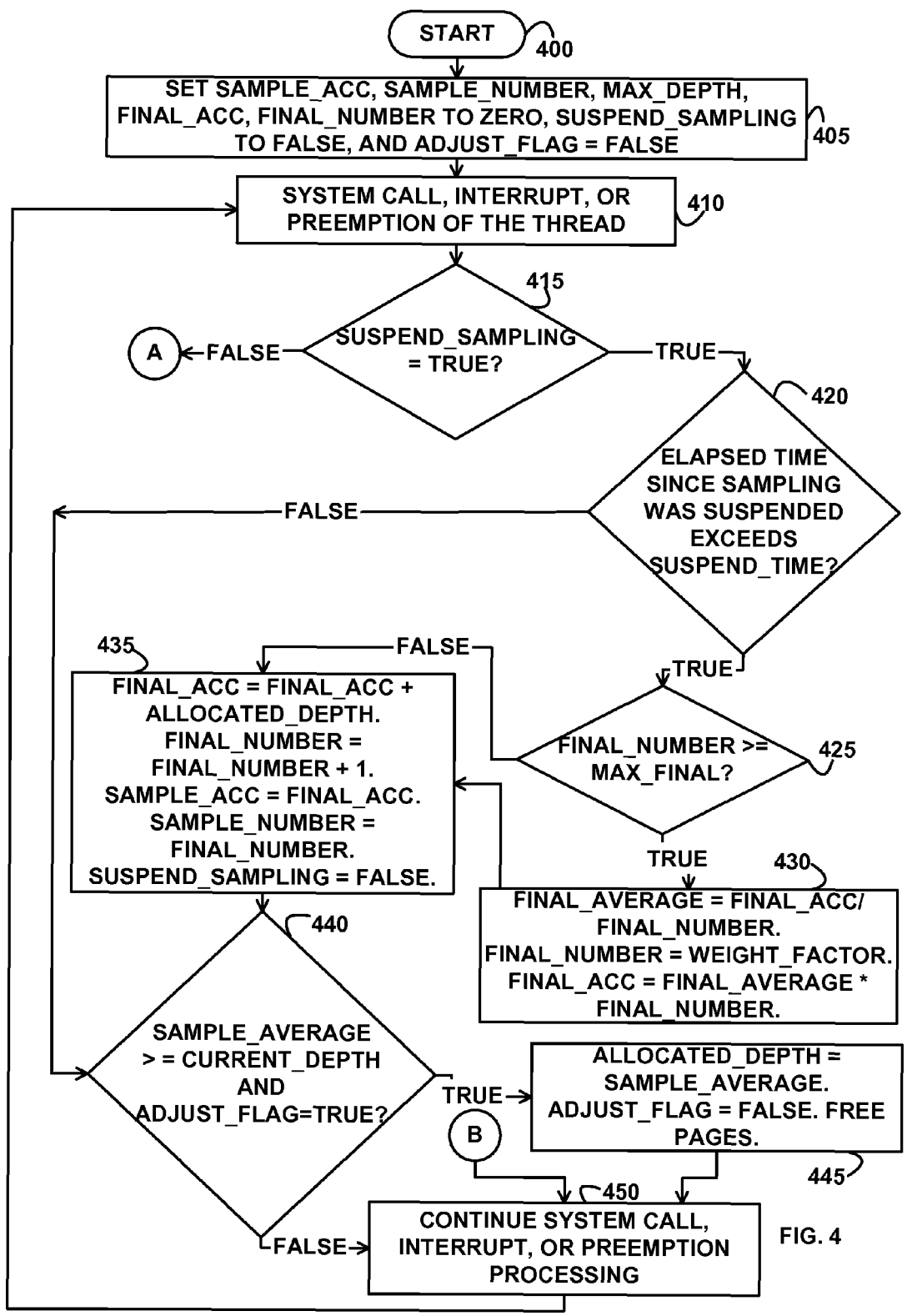
FIG. 4 depicts a flowchart of example processing, according to an embodiment of the invention.
Figure 5:
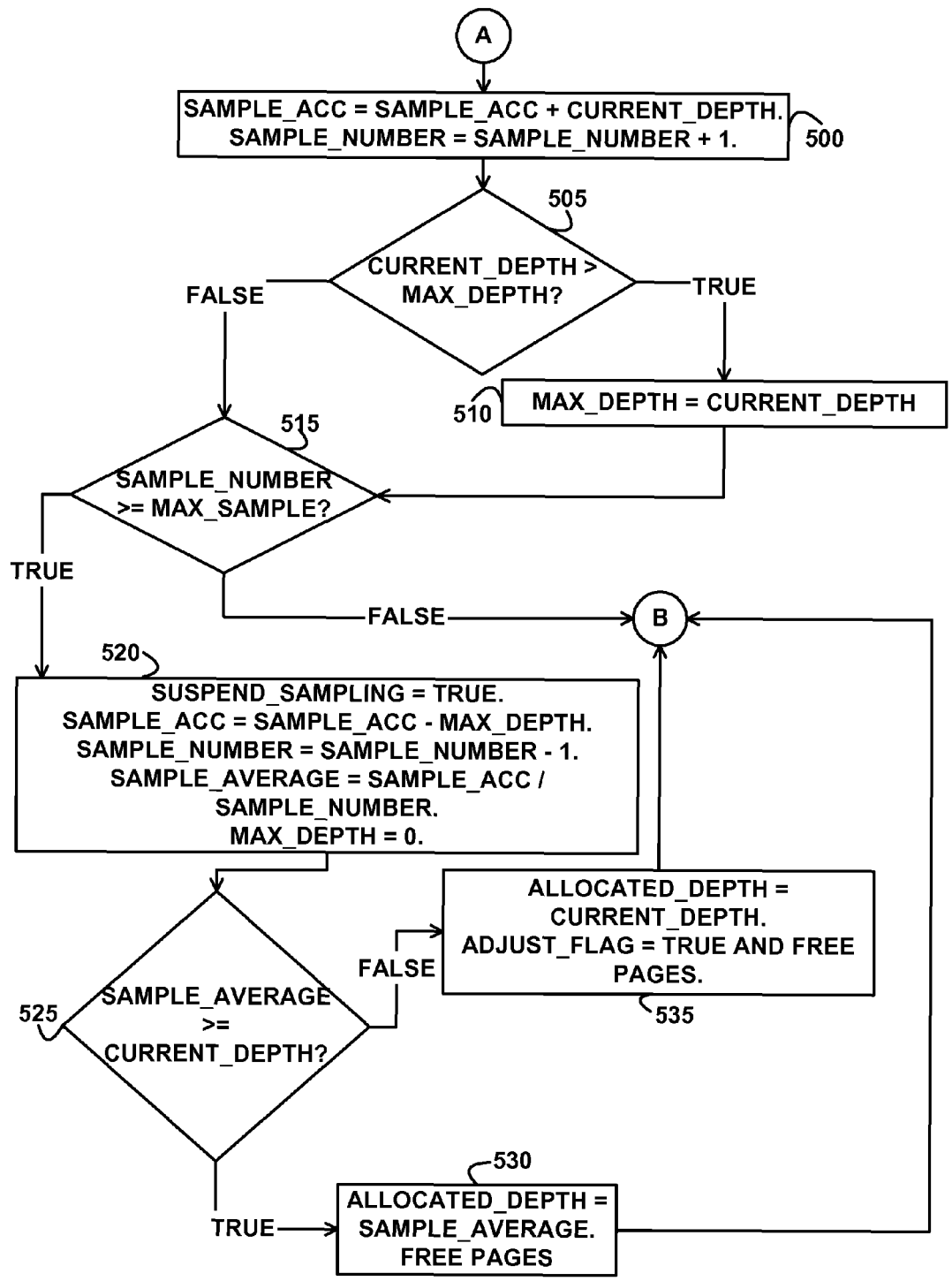
FIG. 5 depicts a flowchart of further example processing, according to an embodiment of the invention.

FIGS. 4 and 5 depict flowcharts of example processing, according to an embodiment of the invention. The logic of FIGS. 4 and 5 may be executed multiple times and for each executing thread.

The following variables, constants, or values are used by the logic of FIGS. 4 and 5 and are stored to and read from the thread data 310 or 312 (FIG. 3) for the respective thread.

The sample_acc is the sample stack depth accumulator and contains the accumulation or sum of the current stack depths 220 or 224 that are sampled (read) and summed together. The sample_acc represents a sample because the controller 156 only modifies the sample_acc in response to a system call, interrupt, or preemption of the thread, which halts execution of the thread; the controller 156 does not continuously update the sample_acc as the current stack depth changes while the thread executes. Thus, the controller does not update sample_acc in response to all changes to the current stack depth of the thread, but only samples the current stack depths and updates sample_acc in response to a system call, interrupt, or preemption of the thread.

The sample_number is the number of the sampled stack depths that are accumulated in the sample_acc.

The sample_average is the average stack depth in the sample_acc and is calculated by dividing the sample_acc by the sample_number.

The max_depth is the maximum or largest stack depth in a sample group that was summed into the sample_acc.

The final_acc is the final stack depth accumulator, which accumulates or sums the depths of all allocated pages 222 or 226 while sampling is suspended and may be adjusted by the weight_factor.

The final_number is the number of final stack depths accumulated (which may be adjusted by the weight_factor) in the final_acc.

The final_average is the average stack depth in the final_acc.

The suspend_sampling flag indicates whether sampling is active or suspended. While sampling is active (a sampling period), the current_depth is accumulated in the sample_acc, and depths are not accumulated in the final_acc. While sampling is inactive, the current_depth is not accumulated in the sample_acc, and depths are accumulated in the final_acc.

The current_depth is the current stack depth 220 or 224 of the call stack for the thread that was executing at the time of the system call, interrupt, or preemption that halted execution of the thread.

The allocated_depth specifies the depth of all allocated pages 222 or 226.

The adjust_flag is a flag that indicates true or false and restricts adjustment of the allocated_depth to the sample_average.

The max_sample variable specifies the maximum number of samples to be taken during a sampling period while sampling is active. In various embodiments, the controller 156 sets the max_sample to a value received from the user I/O device 121, from another program, or from the client computer system 132 via the network 130.

The max_final variable specifies the maximum number of allocated_depths to be accumulated in the final_acc. In various embodiments, the controller 156 sets the max_final to a value received from the user I/O device 121, from another program, or from the client computer system 132 via the network 130.

The weight_factor indicates the magnitude of the weighting of the final_average in the final_acc. In various embodiments, the controller 156 sets the weight_factor to a value received from the user I/O device 121, from another program, or from the client computer system 132 via the network 130.

The suspend_time specifies a threshold value against which the elapsed time since sampling was suspended is compared. In various embodiments, the controller 156 sets the suspend_time to a threshold value received from the user I/O device 121, from another program, or from the client computer system 132 via the network 130.

Control begins at block 400. Control then continues to block 405 where the controller 156 initializes the sample_acc, the sample_number, the max_depth, the final_acc, and the final_number to zero and initializes the suspend_sampling to indicate false and the adjust_flag to indicate false. Initializing suspend_sampling to indicate false causes a sampling period for a thread to start in response to the halting of execution of the thread.

Control then continues to block 410 where a system call, interrupt, or preemption of an executing thread occurs and the controller 156 detects the system call, interrupt, or preemption, which causes execution of the executing thread on the processor 101 to halt.

Control then continues to block 415 where, in response to the system call, interrupt, or preemption of the thread that is now halted, the controller 156 determines whether the suspend_sampling flag indicates true. If the determination at block 415 is true, then the suspend_sampling flag indicates true, sampling is suspended, and the sampling period has ended, so control continues to block 420 where the controller 156 determines whether the elapsed time since sampling became suspended is greater than a suspend_time threshold value.

If the determination at block 420 is true, then the elapsed time since sampling became suspended is greater than the suspend_time threshold value, so control continues to block 425 where the controller 156 determines whether the final_number is greater than or equal to the max_final.

If the determination at block 425 is true, then the final_number is greater than or equal to the max_final, so control continues to block 430 where the controller 156 sets the final_average to be the final_acc divided by the final_number. The controller 156 then sets the final_number to be the weight_factor. The controller 156 then sets the final_acc to be the final_average multiplied by the final_number. In an embodiment, the weight_factor is between zero and one, so that the weight_factor reduces the value of the final_average that is stored in the final_acc.

Control then continues to block 435 where the controller 156 sets the final_acc to be the final_acc plus the allocated_depth. The controller 156 further increments the final_number by one, to reflect the addition of the allocated_depth to the final_acc. The controller 156 then sets the sample_acc to be the final_acc. Thus, in response to the elapsed time since the ending of the sample time period exceeding a time threshold (block 420) and in response to the number of final accumulated stack depths while sampling is suspended reaching a maximum threshold (block 425), the controller 156 sets the accumulation of the stack depths to the final accumulated stack depths reduced by a weight (blocks 430 and 435). The controller 156 further sets the sample_number to be the final_number. The controller 156 further sets suspend_sampling to indicate false, meaning that sampling is no longer suspended and that the next sample time period for the thread starts in response to the next receipt of an indication that the execution of the thread has halted. Thus, the value of the final stack depth accumulator is used as a seed to the sample stack depth accumulator, and the sampling accumulation is restarted. Since the setting of suspend_sampling to indicate false is on the true leg of block 420, in an embodiment, sampling is resumed after, and as a result of, the elapsed time since sampling was suspended exceeding the suspend_time. In other embodiments, other metrics may be used to cause resumption of sampling. For example, sampling may be resumed in response to the total number of thread dispatches that have occurred since sampling was suspended exceeding a threshold number, or the number of I/O operations that have occurred since sample was suspended exceeding a threshold number.

Control then continues to block 440 where the controller 156 determines whether the sample_average is greater than or equal to the current_depth and the adjust_flag indicates true. If the determination at block 440 is true, then the sample_average is greater than or equal to the current_depth and the adjust_flag indicates true, so control continues to block 445 where the controller 156 sets the allocated_depth to be the sample_average and sets the adjust_flag to indicate false. The controller 156 further deallocates or frees the memory pages in the thread's stack whose addresses are above the allocated_depth. That is, the controller 156 deallocates the memory pages in the thread's stack whose addresses are not between the bottom of the call stack and the depth of all allocated pages 222 or 226. A memory page that is deallocated is no longer available to store entries that the controller 156 pushes to the call stack. Control then continues to block 450 where the controller 156 continues system call, interrupt, or preemption processing. The processing of block 450 may include resuming execution of the halted thread on the processor 101 or selecting another thread to start or resume executing on the processor 101. Control then returns to block 410 where the controller 156 receives or detects a system call, interrupt, or preemption of the same or a different thread, as previously described above.

If the determination at block 440 is false, then the sample_average is less than the current_depth or the adjust_flag indicates false, so control continues to block 450 where the controller 156 continues system call, interrupt, or preemption processing, as previously described above, without changing the allocated_depth and without deallocating pages from the stack of the halted thread. Control then returns to block 410, as previously described above.

If the determination at block 425 is false, then the final_number is less than the max_final, so control continues to block 435, as previously described above, without performing the processing described at block 430. Control then continues to block 440, as previously described above.

If the determination at block 420 is false, then the elapsed time since sampling became suspended is less than or equal to the suspend_time threshold value, so control continues directly to block 450, as previously described above, without deallocating pages or changing the final_acc.

If the determination at block 415 is false, then the suspend_sampling indicates false, sampling is not suspended, and a current sampling period is still active, so control continues to block 500 of FIG. 5 where the controller 156 sets the sample_acc to be the sample_acc plus the current_depth. Thus, the controller 156 samples (during the sample time period while sampling is not suspended), a subset of stack depths from all stack depths for a thread (the stack depths for a thread may change while the thread is executing and not halted, so, in an embodiment, more stack depths exist than just those that are sampled), in response to halts of execution of the thread (the thread may halt multiple times at block 410, so the sampling at block 500 may occur multiple times in response to the multiple halts of execution.) Further, the controller 156 increments the sample_number by one, in order to account for the fact the number of samples accumulated by the sample_acc has increased by one by the addition of the current_depth to the sample_acc.

Control then continues to block 505 where the controller 156 determines whether the current_depth is greater than the max_depth. If the determination at block 505 is true, then the current_depth is greater than the max_depth, so control continues to block 510 where the controller 156 sets the max_depth to be the current_depth. Control then continues to block 515 where the controller 156 determines whether the sample_number is greater than or equal to the max_sample.

If the determination at block 515 is true, then the sample_number is greater than or equal to the max_sample, so control continues to block 520 where the controller 156 sets the suspend_sampling to indicate true (meaning that sampling is now suspended and the current sample time period has ended). The controller 156 further saves an indication of the current time, which is the time at which sampling became suspended. Further, the controller 156 sets the sample_acc to be the sample_acc minus the max_depth. Further, the controller 156 decrements the sample_number by one, in order to reflect that fact that the max_depth was subtracted from the sample_acc. The controller 156 then sets the sample_average to be the sample_acc divided by the sample_number. Further, the controller 156 sets the max_depth to be zero. Control then continues to block 525 where the controller 156 determines whether the sample_average is greater than or equal to the current_depth.

If the determination at block 525 is true, then the sample_average is greater than or equal to the current_depth, so control continues to block 530 where the controller 156 sets the allocated_depth to be the sample_average. The controller 156 further frees or deallocates the pages from the call stack whose addresses are above the allocated_depth, which is now the sample_average. That is, the controller 156 deallocates the pages from the call stack whose addresses are not between the bottom of the call stack and the depth of allocated pages 222 or 226. Control then returns to block 450, as previously described above.

If the determination at block 525 is false, then the sample_average is less than the current_depth, so control continues to block 535 where the controller 156 sets the allocated_depth to be the current_depth and sets the adjust_flag to indicate true. The controller 156 further frees or deallocates the pages from the call stack whose addresses are above the allocated_depth, which is now the current_depth. That is, the controller 156 deallocates the pages from the call stack whose addresses are not between the bottom of the call stack and the depth of all allocated pages 222 or 226. Since the allocated_depth is now the current_depth, the controller 156 deallocates all pages from the call stack that are allocated but not storing valid entries. Control then returns to block 450, as previously described above.

If the determination at block 515 is false, then the sample_number is less than the max_sample, so control returns to block 450, as previously described above, without performing the processing of blocks 520, 525, 530, and 535.

If the determination at block 505 is false, then the current_depth is less than or equal to the max_depth, so control continues to block 515, as previously described above, without setting the max_depth.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention.

In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
sampling a plurality of stack depths of a stack from all stack depths of the stack during a sample time period;
calculating an average of the plurality of stack depths; and
if a number of the plurality of stack depths is greater than a maximum sample threshold and the average of the plurality of stack depths is greater than or equal to a current depth of the stack, deallocating pages from the stack that are above the average of the plurality of stack depths.

2. The method of claim 1, further comprising:
if the number of the plurality of stack depths is greater than the maximum sample threshold and the average of the plurality of stack depths is less than the current depth of the stack, deallocating pages from the stack that are above the current depth of the stack.

3. The method of claim 1, wherein the sampling the plurality of stack depths from all stack depths further comprises:
sampling, during the sample time period, the plurality of stack depths from all stack depths for a thread, in response to a halt of execution of the thread.

4. The method of claim 3, further comprising:
if the number of the plurality of stack depths is greater than the maximum sample threshold, ending the sample time period.

5. The method of claim 4, further comprising:
in response to a halt of the thread after the ending of the sample time period, if an elapsed time since the ending of the sample time period exceeds a time threshold, if the average of the plurality of stack depths is greater than or equal to a current depth of the stack at a time of the halt of the thread after the ending of the sample time period, and
if the deallocating the pages from the stack that are above the current depth of the stack was performed during the sample time period, deallocating the pages from the stack that are above the average of the plurality of stack depths after the ending of the sample time period.

6. The method of claim 5, further comprising:
in response to the halt of the thread after the ending of the sample time period, if the elapsed time since the ending of the sample time period exceeds a time threshold, if the average of the plurality of stack depths is greater than or equal to a current depth of the stack at a time of the halt of the thread after the ending of the sample time period, and if the deallocating the pages from the stack that are above the current depth of the stack was not performed during the sample time period, refraining from performing the deallocating the pages from the stack that are above the average of the plurality of stack depths after the ending of the sample time period.

7. The method of claim 6, further comprising:
if the elapsed time since the ending of the sample time period exceeds the time threshold and if a number of final accumulated stack depths while sampling is suspended has reached a maximum threshold, setting an accumulation of the plurality of stack depths to the final accumulated stack depths reduced by a weight, and restarting the sampling the plurality of stack depths of the stack.

8. A computer-readable storage medium encoded with instructions, wherein the instructions when executed comprise:
sampling a plurality of stack depths of a stack from all stack depths of the stack during a sample time period;
calculating an average of the plurality of stack depths; and
if a number of the plurality of stack depths is greater than a maximum sample threshold and the average of the plurality of stack depths is greater than or equal to a current depth of the stack, deallocating pages from the stack that are above the average of the plurality of stack depths.

9. The computer-readable storage medium of claim 8, further comprising:
if the number of the plurality of stack depths is greater than the maximum sample threshold and the average of the plurality of stack depths is less than the current depth of the stack, deallocating pages from the stack that are above the current depth of the stack.

10. The computer-readable storage medium of claim 8, wherein the sampling the plurality of stack depths from all stack depths further comprises:
sampling, during the sample time period, the plurality of stack depths from all stack depths for a thread, in response to a halt of execution of the thread.

11. The computer-readable storage medium of claim 10, further comprising:
if the number of the plurality of stack depths is greater than the maximum sample threshold, ending the sample time period.

12. The computer-readable storage medium of claim 11, further comprising:
in response to a halt of the thread after the ending of the sample time period, if an elapsed time since the ending of the sample time period exceeds a time threshold, if the average of the plurality of stack depths is greater than or equal to a current depth of the stack at a time of the halt of the thread after the ending of the sample time period, and
if the deallocating the pages from the stack that are above the current depth of the stack was performed during the sample time period, de allocating the pages from the stack that are above the average of the plurality of stack depths after the ending of the sample time period.

13. The computer-readable storage medium of claim 12, further comprising:
in response to the halt of the thread after the ending of the sample time period, if the elapsed time since the ending of the sample time period exceeds a time threshold, if the average of the plurality of stack depths is greater than or equal to a current depth of the stack at a time of the halt of the thread after the ending of the sample time period, and if the deallocating the pages from the stack that are above the current depth of the stack was not performed during the sample time period, refraining from performing the deallocating the pages from the stack that are above the average of the plurality of stack depths after the ending of the sample time period.

14. The computer-readable storage medium of claim 13, further comprising:
if the elapsed time since the ending of the sample time period exceeds the time threshold and if a number of final accumulated stack depths while sampling is suspended has reached a maximum threshold, setting an accumulation of the plurality of stack depths to the final accumulated stack depths reduced by a weight, and restarting the sampling the plurality of stack depths of the stack.

15. A computer comprising:
a processor; and
memory communicatively coupled to the processor, wherein the memory is encoded with instructions, and wherein the instructions when executed on the processor comprise:
sampling a plurality of stack depths of a stack from all stack depths of the stack during a sample time period, wherein the sampling the plurality of stack depths from all stack depths further comprises sampling, during the sample time period, the plurality of stack depths from all stack depths for a thread, in response to a plurality of halts of execution of the thread,
calculating an average of the plurality of stack depths, and
if a number of the plurality of stack depths is greater than a maximum sample threshold and the average of the plurality of stack depths is greater than or equal to a current depth of the stack, deallocating pages from the stack that are above the average of the plurality of stack depths.

16. The computer of claim 15, wherein the instructions further comprise:
if the number of the plurality of stack depths is greater than the maximum sample threshold and the average of the plurality of stack depths is less than the current depth of the stack, deallocating pages from the stack that are above the current depth of the stack.

17. The computer of claim 16, wherein the instructions further comprise:
if the number of the plurality of stack depths is greater than the maximum sample threshold, ending the sample time period.

18. The computer of claim 17, wherein the instructions further comprise:
in response to a halt of the thread after the ending of the sample time period, if an elapsed time since the ending of the sample time period exceeds a time threshold, if the average of the plurality of stack depths is greater than or equal to a current depth of the stack at a time of the halt of the thread after the ending of the sample time period, and
if the deallocating the pages from the stack that are above the current depth of the stack was performed during the sample time period, deallocating the pages from the stack that are above the average of the plurality of stack depths after the ending of the sample time period.

19. The computer of claim 18, wherein the instructions further comprise:
in response to the halt of the thread after the ending of the sample time period, if the elapsed time since the ending of the sample time period exceeds a time threshold, if the average of the plurality of stack depths is greater than or equal to a current depth of the stack at a time of the halt of the thread after the ending of the sample time period, and if the deallocating the pages from the stack that are above the current depth of the stack was not performed during the sample time period, refraining from performing the equal to a current depth of the stack, deallocating pages from the stack that are above the average of the plurality of stack depths.

20. The computer of claim 19, wherein the instructions further comprise:
if the elapsed time since the ending of the sample time period exceeds the time threshold and if a number of final accumulated stack depths while sampling is suspended has reached a maximum threshold, setting an accumulation of the plurality of stack depths to the final accumulated stack depths reduced by a weight, and restarting the sampling the plurality of stack depths of the stack.

* * * * *